(12) United States Patent
Baudouin (10) Patent No.: US 7,802,836 B2
(45) Date of Patent: Sep. 28, 2010

(54) ANTI-DAZZLE SUN VISOR FOR MOTOR VEHICLES

(75) Inventor: Jacky Baudouin, Aix-en-Provence (FR)

(73) Assignee: Webasto AG, Stockdorf (DE)

( * ) Notice: Subject to any disclaimer, the term of this patent is extended or adjusted under 35 U.S.C. 154(b) by 154 days.

(21) Appl. No.: 12/296,064

(22) PCT Filed: Apr. 5, 2007

(86) PCT No.: PCT/DE2007/000620

§ 371 (c)(1),
(2), (4) Date: Oct. 3, 2008

(87) PCT Pub. No.: WO2007/112735

PCT Pub. Date: Oct. 11, 2007

(65) Prior Publication Data

US 2009/0278375 A1  Nov. 12, 2009

(30) Foreign Application Priority Data

Apr. 6, 2006 (FR) .................................. 06 03015

(51) Int. Cl.
*B60J 3/00* (2006.01)
(52) U.S. Cl. .................. 296/97.1; 296/97.2; 296/97.11
(58) Field of Classification Search ................ 296/97.1, 296/97.2, 97.11
See application file for complete search history.

(56) References Cited

U.S. PATENT DOCUMENTS

| 4,149,749 | A | * | 4/1979 | Canal | 296/97.1 |
| 4,679,842 | A | * | 7/1987 | Hwang-Change | 296/97.11 |
| 5,031,952 | A | | 7/1991 | Miyamoto | |
| 6,279,984 | B1 | * | 8/2001 | Reina, Jr. | 296/97.1 |
| 7,216,917 | B2 | * | 5/2007 | Tadakamalla | 296/97.11 |

FOREIGN PATENT DOCUMENTS

| FR | 2705397 | 11/1994 |
| FR | 2827226 | 1/2003 |

OTHER PUBLICATIONS

International Search Report dated Aug. 9, 2007.

* cited by examiner

*Primary Examiner*—Lori L Lyjak
(74) *Attorney, Agent, or Firm*—Fitch, Even, Tabin & Flannery; John M. Naber (57) ABSTRACT

An anti-dazzle sun visor for use in the upper part of a windshield of a motor vehicle. The anti-dazzle sun visor is characterized by a screen which is hinged to a suspension, mounted so as to be movable to be displaced along the windshield, and a curtain which is extensible below a part of the windshield considered to be shadable, the curtain extending between the mobile suspension and the upper edge of the windshield.

16 Claims, 6 Drawing Sheets

ANTI-DAZZLE SUN VISOR FOR MOTOR VEHICLES

This application is a 35 U.S.C. §371 National Stage entry of PCT/DE2007/000620, filed Apr. 5, 2007, which claims priority from French Patent Application No.: FR 06/03015, filed Apr. 6, 2006, the contents of which are herein incorporated by reference.

BACKGROUND OF THE INVENTION

The present invention relates to an anti-dazzle sun visor intended for use in the upper part of a windshield of a motor vehicle.

The invention is used particularly advantageously, but not exclusively, in the field of vehicles which are provided with windshields extending above the front seats.

FIELD OF THE INVENTION

In the field of motor vehicles it is known per se to use anti-dazzle sun visors in the region of the upper part of a windshield, in order to be protected from light sources which are too intense. In particular, direct solar radiation is referred to in this case but also glare from the headlights of other road users.

BRIEF SUMMARY OF THE INVENTION

The principle is to arrange a screen between the eyes of each front occupant of the vehicle and the relevant light source, the aforementioned screen ideally having to be positioned directly above the field of vision actually used by the aforementioned occupant. The object of the invention is naturally to limit the risk of glare, which is capable of distracting the driver and/or disturbing the passenger.

Nowadays, anti-dazzle sun visors which are used generally consist of light-impermeable screens, which are articulated in the region of the roof lining of the vehicle, so that in the region of the upper part of the windshield they may be aligned mainly to the front and, if required, accordingly to the side in the region of an upper part of a front side window.

In practice, a motor vehicle is generally provided with two screens which are arranged at both lateral ends of the interior fittings which clad the roof lining, and which are respectively able to black out parts of the windshield located on both sides of the internal rear view mirror. Moreover, each screen is generally of a height which is restricted to approximately ten centimeters and of a width which substantially corresponds to half of the windshield.

Based upon the fact that only the main function is essential, i.e. the blacking out of the upper part of the windshield, each screen is generally movably mounted for a horizontal pivoting movement between, on the one hand, a passive position in which it is arranged flat on the internal cladding of the vehicle and, on the other hand, an active position, in which it extends more or less parallel with the upper part of the windshield.

This type of anti-dazzle sun visor, however, has the drawback that it is particularly poorly suited to windshields of great height and, in particular, those which extend into the roof lining above the front seats. Due to their large dimensions, such glass surfaces are in fact particularly subjected to light radiation, in particular in the upper region. As a result, it is imperative to have sufficiently large screens in order to be able to black out relatively large parts of the windshields, if required.

Oversized screens, however, prove to be particularly difficult to use as their dimensions are excessively large, which requires a corresponding space, in particular for the tilting movement. Due to the design of the interior and/or the height of the user, this fundamental drawback may even be insuperable when the movement of the screen requires a movement of the head of the aforementioned user.

Whilst screens with large dimensions are acceptable for utility vehicles, they are nevertheless additionally unattractive and thus less suitable for passenger vehicles of the monospace type and/or recreational vehicles. In this case, a problem is encountered which substantially corresponds to the difficulty of having to use the external rearview mirrors.

Thus the problem to be solved by the subject-matter of the present invention is to propose an anti-dazzle sun visor which is intended to be used in the upper part of a windshield of a motor vehicle, the aforementioned anti-dazzle sun visor allowing the problems of the prior art to be avoided, in practice in particular by substantially improved comfort being provided during use and at the same time an aesthetically advantageous design being made possible.

The solution of the technical problem set forth according to the invention consists in that the anti-dazzle sun visor has a screen which is articulated to a suspension device movably mounted for displacement along the windshield, as well as a blind which is capable of being extended below a part of the windshield, denoted as being able to be blacked out, and extending between the movable suspension device and the upper edge of the aforementioned windshield.

In a particularly advantageous manner, the mobility of the suspension device makes it possible to adjust the position of the screen along the windshield according to the height in the best possible manner, whilst the blind makes it possible to cover the part of the windshield extending thereover. The mobility of the screen accordingly makes it possible to adjust accurately the blackout effect of the anti-dazzle sun visor.

It is understood that the screen may be configured in absolutely any manner, in particular with regard to the structure and/or the shape and/or the dimensions.

Moreover the same applies to the blind, said blind equally being able to adopt a plurality of positions or not, being able to have a motorized drive or not, and being able to be accommodated in any manner, in particular by rolling up or folding.

The fact that the screen has articulated joints simply means that it is capable of being moved into a plurality of different positions which may extend three-dimensionally within the space.

The invention thus defined provides the advantage of being perfectly suited to windshields of large height.

As the blackout capacity of a screen is combined with that of a blind, such an anti-dazzle sun visor is actually able to cover a large surface area in the upper part of the windshield.

The mobility of the suspension device of the screen permits in turn a precise adjustment of the size of the anti-dazzle sun visor according to the relative position of the respective light source relative to the eyes of the user.

The presence of the blind makes it possible, moreover, to use a screen of limited height, i.e. a screen of which the handling does not require the space available in the interior to be excessively used up, which increases the comfort of the vehicle occupant.

Finally, overall the reduced space requirement of the anti-dazzle sun visor both in the extended position and in the received position has a significant advantage from a purely aesthetic point of view.

The present invention also relates to features which are revealed in the course of the present description and which respectively have to be considered individually or with all their possible technical combinations.

BRIEF DESCRIPTION OF THE DRAWINGS

The above description is given by way of non-limiting example and is intended to make it easier to understand what the invention consists of and how it may be achieved. Moreover, reference is made to the accompanying drawings, in which.

For reasons of clarity, the same components are denoted by identical reference numerals. Moreover, only the components which are essential for understanding the invention have been shown and namely in schematic form and respectively without being to scale.

DETAILED DESCRIPTION OF THE INVENTION

Figure 1:
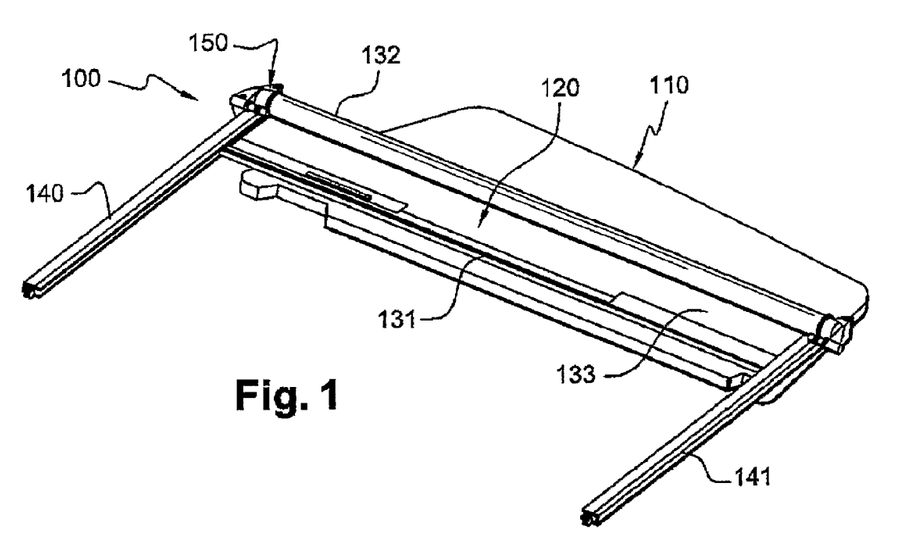
FIG. 1 shows in perspective from above an anti-dazzle sun visor according to a first embodiment of the invention.
Figure 2:
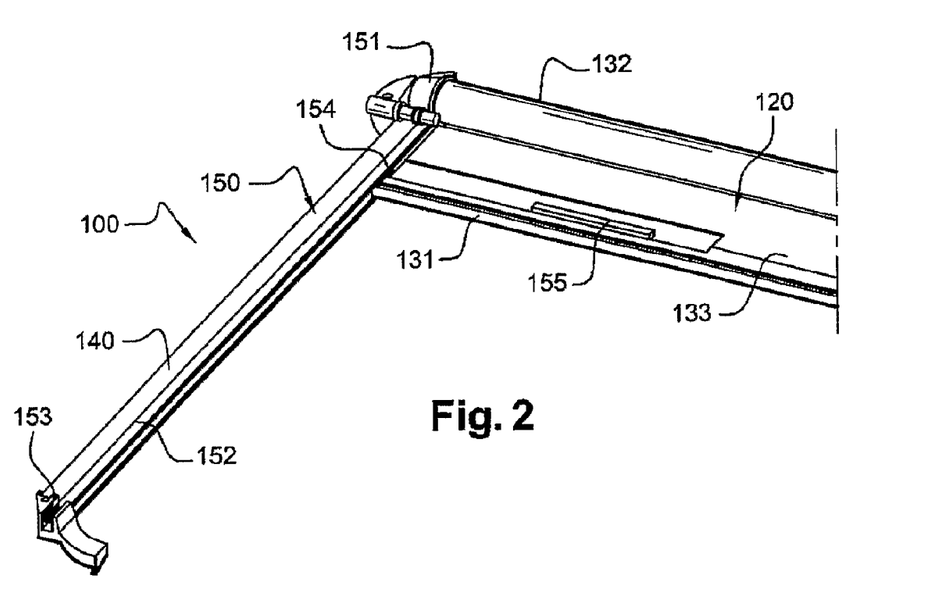
FIG. 2 shows the structure of the anti-dazzle sun visor according to FIG. 1 in more detail.

FIGS. 1 and 2 show an anti-dazzle sun visor 100 which is intended to be mounted in the upper part of a windshield 10 of a motor vehicle 1 in order to be able to be operated from inside the interior by at least one occupant on the front seats.

According to the subject-matter of the present invention, the aforementioned anti-dazzle sun visor 100 is provided with a screen 110 which is articulated to a suspension device 120 which in turn is movably mounted for displacement along the windshield 10, as well as a blind 130 which may be extended below a part of the windshield 10, which is denoted as a part 11 to be blacked out and which extends between the suspension device 120 and the upper edge of the aforementioned windshield 10.

According to a feature of the invention, the blind 130 is movably mounted for displacement between an open position in which it is received in the vicinity of the part 11 to be blacked out of the windshield 10 and a closed position in which it extends below the aforementioned part 11 to be blacked out.

According to a first embodiment of the invention, the blind 130 in the open position is received in the region of a fixed part of the anti-dazzle sun visor 100 which forms a receiver region.

It is intended in this case and in the entire text of the description that the term "receiver region" also relates to a component and the part of a component, which is an integral component of the anti-dazzle sun visor 100, or a component of the motor vehicle 1 or a part of a component, which serves as the suspension device and thus is indirectly part of the structure of the aforementioned anti-dazzle sun visor 100. A reinforcing element of the bodywork, such as for example the upper pillar of the windshield, or an internal fittings part for cladding the roof lining and even the actual windshield 10, for example, are understood as parts of the motor vehicle 1.

Figure 3:
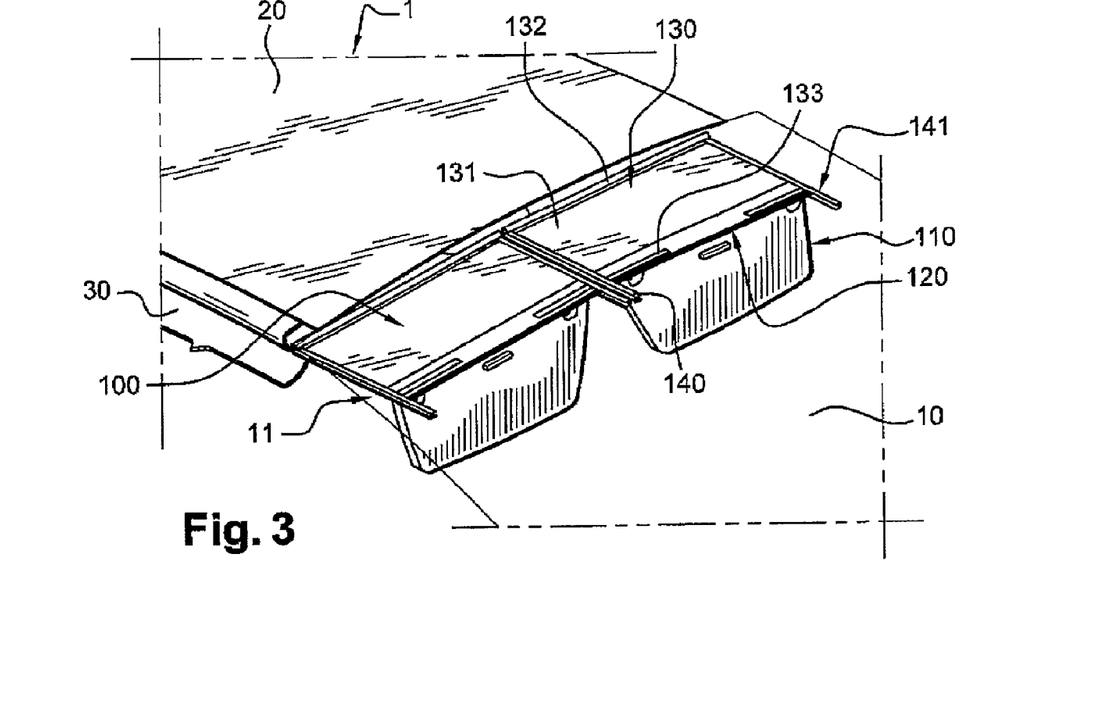
FIG. 3 shows a perspective view from above of a sun visor of a motor vehicle, which is provided with two anti-dazzle sun visors according to FIGS. 1 and 2; each anti-dazzle sun visor is in this case respectively shown in the extended state.
Figure 4:
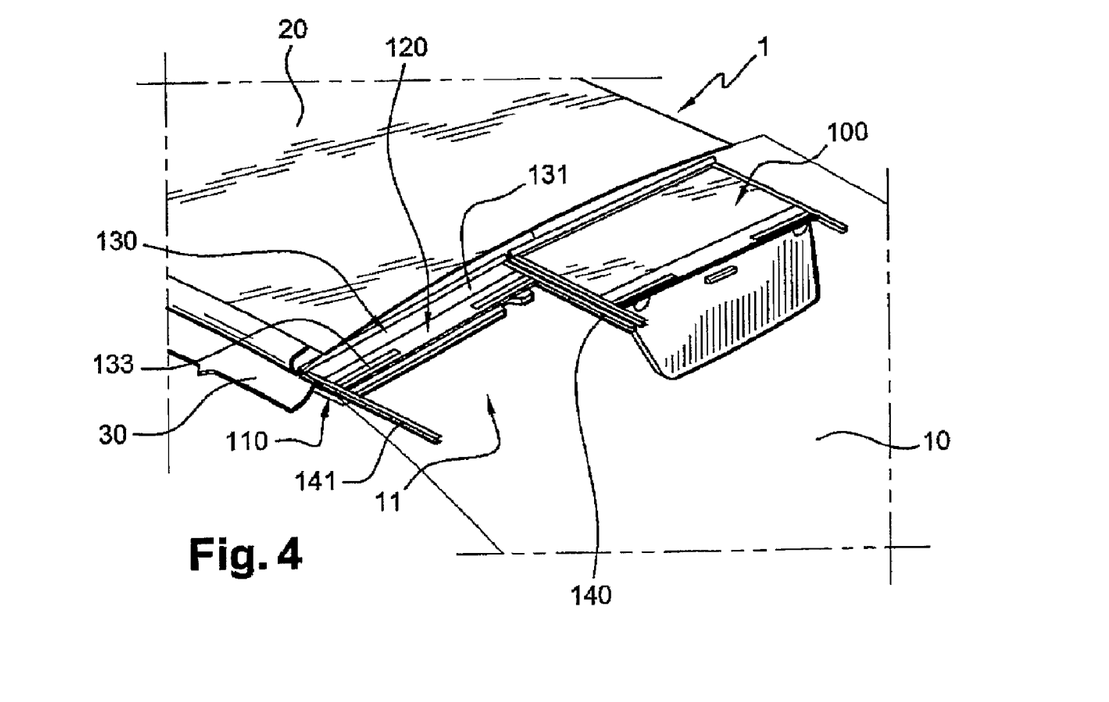
FIG. 4 shows a similar view to FIG. 3, but with the anti-dazzle sun visors folded up.
Figure 5:
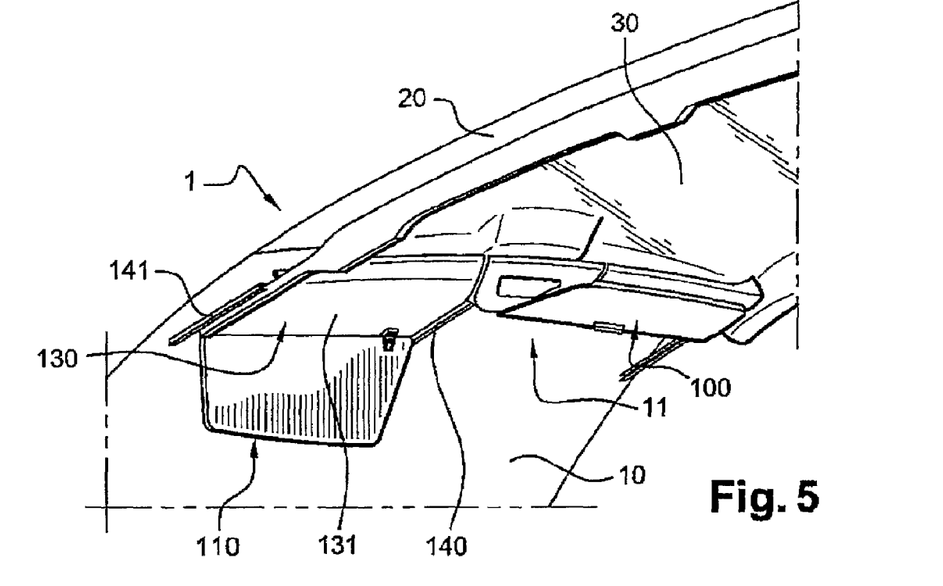
FIG. 5 shows a view similar to FIG. 4 but in perspective from below.

According to an advantageous feature of the aforementioned first embodiment which may be seen in FIGS. 3 to 5, the receiver region of the anti-dazzle sun visor 100 is intended to be positioned in the vicinity of the upper edge of the windshield 10.

The object is to position the receiver region of the blind 130 in an optimal manner in the interior of the vehicle, i.e. as close as possible to the part 11 to be blacked out of the windshield 10. Such a design makes it possible to limit the maximum length of the blind, and thus the space requirement of the anti-dazzle sun visor 100 in the open position. The ultimate goal is naturally not to impair the spatial comfort of the motor vehicle 1.

According to a feature of the invention present in the first embodiment, the use of the blind 130 is associated with the displacement of the movable suspension device 120.

In this type of arrangement, the blind 130 connects the receiver region to the movable suspension device 120 in a continuous manner, i.e. it permanently covers a space which extends between the upper edge of the windshield 10 and the part of the anti-dazzle sun visor 100 bearing the screen 110. As, however, the receiver region in this case is fixed, this means that the use of the blind 130 is systematically controlled by the movement of the movable suspension device 120 along the windshield 10.

In the case of the particular example shown in FIGS. 1 to 5, the end of the blind 130 is fixedly connected to the movable suspension device 120, as it is received in the region of a fixed part of the anti-dazzle sun visor 100 i.e. in this case the receiver region. Accordingly, the blind 130 is extended when the movable suspension device 120 is removed from the receiver region whilst it is folded up when the movable suspension device 120 is brought closer to the aforementioned receiver region.

If, however, according to a variant of the invention the blind 130 were intended to be received in the region of the movable suspension device 120, this might mean that one end of the aforementioned blind 130 would be fixedly connected to a fixed part of the anti-dazzle sun visor 100.

According to a further feature of the invention used in this first embodiment, the blind 130 is designed such that it may adopt a plurality of positions.

In this particular embodiment, selected merely as an example, the blind 130 in practice consists of a light-permeable canvas 131 of which two opposing ends are respectively fixedly connected to a rolling tube 132, on the one hand, which is movably mounted in axial rotation in the vicinity of the part 11 to be blacked out of the windshield 10 and, on the other hand, a drawbar 133 which in turn is movably mounted for displacement along the aforementioned part 11 to be blacked out. The whole assembly is designed such that the canvas 131 in the open position is rolled up around the rolling tube 132 (FIGS. 1 and 2), and such that the aforementioned canvas 131 in the closed position extends below the part 11 to be blacked out of the windshield 10 (FIG. 3).

It is noteworthy that in this embodiment the drawbar 133 and the movable suspension device 120 due to the permanent coupling during displacement between the blind 130 and the aforementioned movable suspension device 120 merely form one and the same piece.

Irrespective thereof, however, the anti-dazzle sun visor 100 is provided with means 150 which are capable of connecting the movement of the drawbar 133 to the axial rotation of the rolling tube 132, when the canvas 131 is driven for displacement between the open position and the closed position, in order to be able to have a plurality of possibilities for positioning.

From the structural point of view, the aforementioned coupling means 150 schematically consist of a combination of conical rollers 151 and drive cables 152 which are guided by deflection rollers 153, 154.

As may be seen more clearly in FIG. 3, each end of the rolling tube 132 carries a conical roller 151 to which a drive cable 152 extending in the direction of the front part of the anti-dazzle sun visor 100 is fastened and is able to be rolled up thereon or unrolled therefrom. Each drive cable 152 is then passed back to the receiver region due to the presence of a first deflection roller 153, before it is diverted at right angles via a second deflection roller 154 into the region of the drawbar 133, to which it is fastened via a tension spring 155. The aforementioned elastic return means 155 has, in a manner known per se, the purpose of compensating possible deviations between the displacement distance of the drawbar 133 and the unrolling length and rolling-up length of the canvas 131 and thus keeping the aforementioned canvas 131 under constant tension between the aforementioned drawbar 133 and the rolling tube 132.

Such coupling means according to the prior art are known per se and are not disclosed here with reference to the operation thereof.

Naturally, a plurality of mechanisms exist which are able to fulfill the coupling function, as has been disclosed above. For this reason, in principle all known coupling means 150 may be used in an equivalent manner within the scope of the invention.

In a further feature of the invention implemented in the aforementioned first embodiment, the movable suspension device 120 is advantageously slidably mounted along two guide rails 140, 141, which are intended to be arranged on both sides of the part 11 to be blacked out of the windshield 10 according to FIGS. 3 to 5.

According to a further feature of the invention used in the first embodiment and in particular seen in FIGS. 4 and 5, the screen 110 is movably mounted for pivoting, on the one hand, according to a first axis substantially parallel to the movable suspension device 120 and, on the other hand, in a second manner substantially perpendicular to the aforementioned first pivot axis.

The first mobility allows the screen 110 to be aligned to the front in the region of the upper part of the windshield 10 or to be pressed against the internal cladding 30 of the roof lining 20 for the purpose of being received. The second pivotability allows, in turn, a positioning of the screen 110 at the side in the region of the upper part of the corresponding side window (not shown) of the vehicle 1.

FIGS. 3 to 5 show different examples of the embodiment, which may be obtained by two anti-dazzle sun visors 100 corresponding to the above description being used in the interior of a motor vehicle 1.

FIG. 3 shows the two blinds 130 as well as the two screens 110 respectively in the extended position.

In the second case of FIGS. 4 and 5, the right-hand anti-dazzle sun visor 100 (viewed from the interior of the passenger compartment) is shown completely folded up, i.e. its blind 130 is rolled up in the receiver region whilst its screen 110 is accommodated flat and parallel to the roof lining 20.

Figure 6:
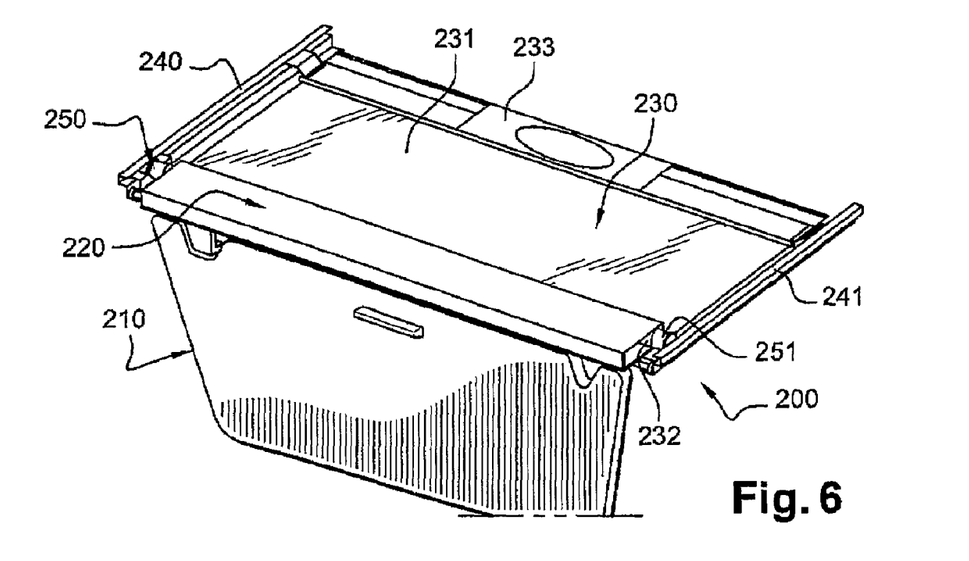
FIG. 6 shows in perspective from above an anti-dazzle sun visor according to a second embodiment of the invention.
Figure 7:
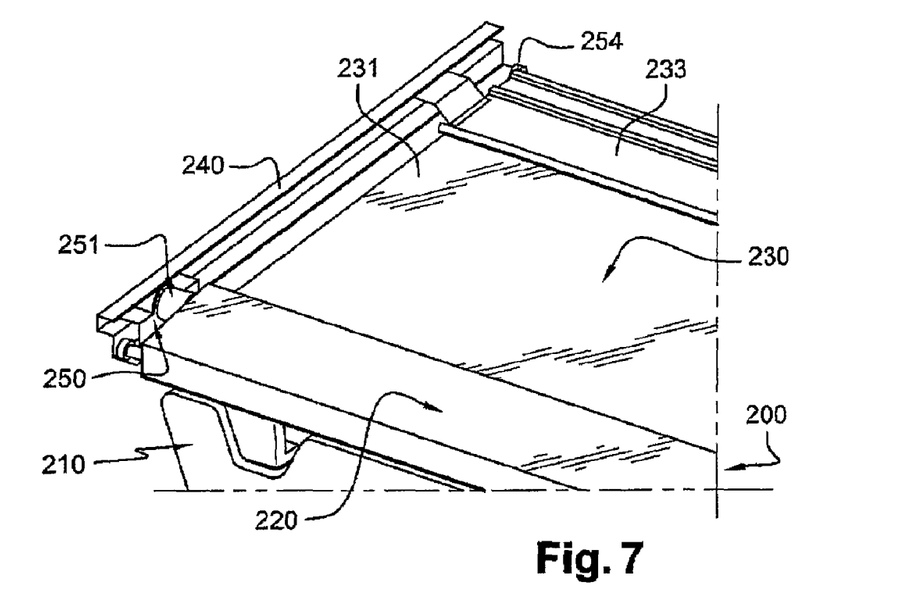
FIG. 7 shows the structure of the anti-dazzle sun visor according to FIG. 6 in more detail.
Figure 8:
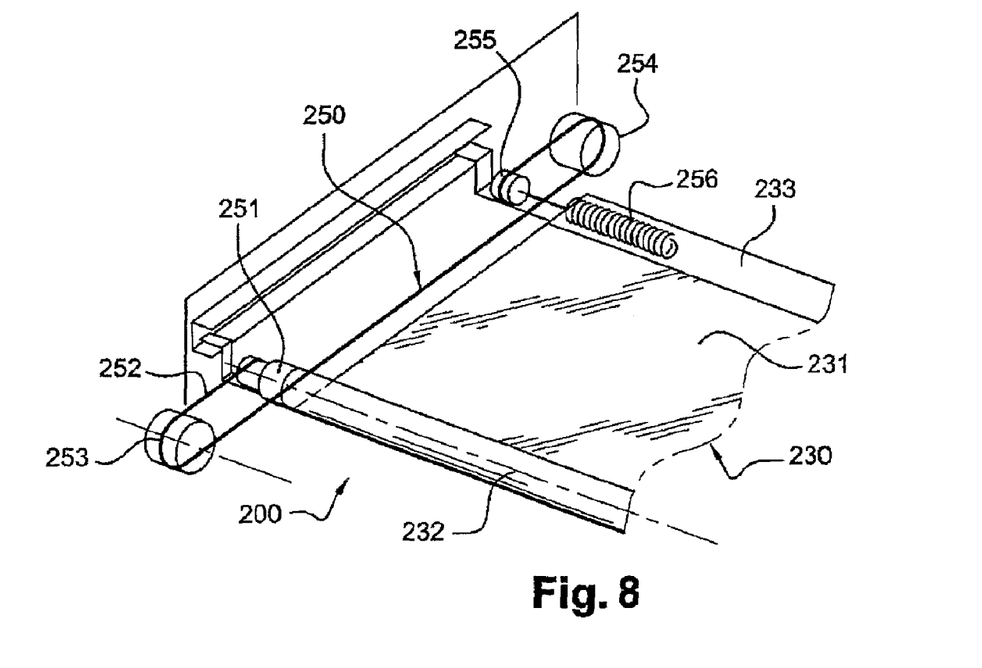
FIG. 8 shows a diagram which illustrates the operation of the anti-dazzle sun visor according to FIGS. 6 and 7.

FIGS. 6 to 8 show an anti-dazzle sun visor 200 which corresponds to a second embodiment of the invention, but is nevertheless also intended to be used in the upper part of a windshield 11 of a motor vehicle 1.

The aforementioned second embodiment differs substantially, however, from the disclosed first embodiment in the fact that in this case the blind 230 in the open position is received on the movable suspension device.

According to a feature of the invention used in the aforementioned second embodiment, the use of the blind 230 is independent of the displacement of the movable suspension device.

In this type of embodiment the blind 230 is not connected permanently and simultaneously to the upper part of the windshield and the movable suspension device 220, i.e. the space extending between the upper edge of the aforementioned windshield 10 and the part of the anti-dazzle sun visor 200 bearing the screen 210 is not systematically covered. This also means that the blind 230 is operated completely autonomously and in particular independently of the displacement of the movable suspension device 220.

According to a further feature of the invention used in the aforementioned second embodiment, the movable suspension device 220 is slidably mounted along two guide rails 240, 241 which, as is visible in FIGS. 9 to 12, are intended to be arranged on both sides of the part 11 to be blacked out of the windshield 10.

In this second embodiment, the blind 230 consists of a canvas 231, the two opposing ends thereof respectively being fixedly connected, on the one hand, to a rolling tube 232 which is movably mounted in axial rotation in the vicinity of the part 11 to be blacked out of the windshield 10 and, on the other hand, a drawbar 233 which is movably mounted for displacement along the aforementioned part 11 to be blacked out. Accordingly, the extension or the folding up of the blind 230 takes place by specific action on the drawbar 133 of the anti-dazzle sun visor 200 which in this case is completely separate from the movable suspension device 220.

Moreover, the drawbar 233 is preferably movably and slidably mounted along two guide rails, which are intended to be mounted along both sides of the part 11 to be blacked out of the windshield 10.

In this embodiment, the drawbar 233 and the movable suspension device 220 are formed by two completely separate parts. Accordingly, it proves particularly advantageous that the two guide rails 240, 241, which ensure the sliding of the movable suspension device 220, are the same as those which ensure the sliding of the drawbars 233.

In a similar manner to the first embodiment described above, the blind 230 of the aforementioned second embodiment is of the type which is able to adopt a plurality of positions.

The anti-dazzle sun visor 200 is, moreover, also provided with means 250 which are able to couple the displacement of the drawbar 233 with the axial rotation of the rolling tube 232, when the canvas 231 is driven for displacement between the open and the closed position.

The aforementioned coupling means 250 are, however, configured slightly differently from the equivalent coupling means of the first embodiment.

As may be seen in particular in FIG. 8, each end of the rolling tube 232 bears a conical roller 251 to which a drive cable 252 is fastened, which may be rolled up or unrolled and extended in the direction of the front part of the anti-dazzle sun visor 200. Each drive cable 252 is then passed back to the rear due to the presence of a first deflection roller 253 before it is again deflected to the front via a second deflection roller 254. The drive cable 252 is then steered over a third deflection roller 255 perpendicular to the drawbar 233, to which it is fastened via a tension spring 256. Also in this case, the aforementioned elastic return means 156 have the purpose of compensating for possibly different dimensions in the transmission chain which ensures the coupling of the drawbar 233 and the rolling tube 232 for displacement; the object in this case is again to keep the tension of the canvas 231 constant.

In a similar manner to the case of the first embodiment of the invention, in this case the coupling means 250 are also known per se according to the prior art and neither the structure nor the function thereof are described in more detail here.

Naturally, a plurality of mechanisms exist which are able to fulfill the coupling function as has been described above. For this reason, in principle all known coupling means 250 may be used in the equivalent manner within the scope of the invention.

In the event that the blind 230 is not of the type which allows a plurality of positions, a variant may consist in providing the anti-dazzle sun visor 200 with temporary connection means which are able to connect the free end of the blind 230 to at least one fixing point in a disconnectable manner.

Two different embodiments therefore have to be considered in principle.

The first corresponds to the case in which it is provided to receive the blind in the region of a fixed part of the anti-dazzle sun visor 200. A fastening point may then advantageously be arranged on the movable suspension device 220.

The second embodiment corresponds to the situation in which the whole assembly is designed such that the blind 230 is received in the region of the movable suspension device 220. The anti-dazzle sun visor 220 may then advantageously have a fastening point and, in particular, the receiver region at a fixed part of the anti-dazzle sun visor.

FIGS. 9 to 12 show different examples of the embodiment which may be obtained by two anti-dazzle sun visors 200 being used in the interior of a motor vehicle 1 according to the above description.

Figure 9:
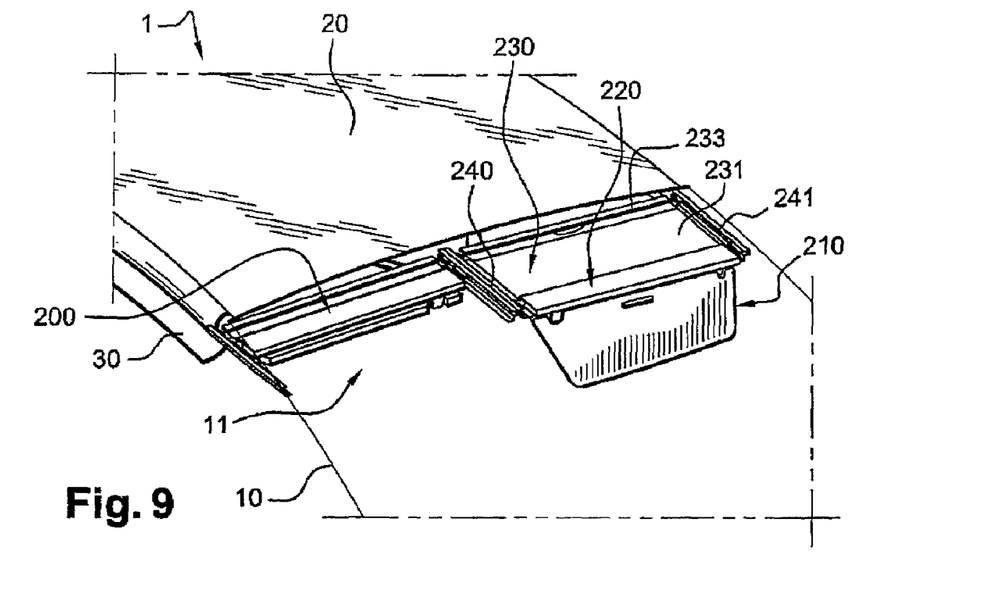
FIG. 9 shows a perspective view from above of a sun visor of a motor vehicle which is provided with two anti-dazzle sun visors according to FIGS. 6 to 8; the aforementioned anti-dazzle sun visors are respectively shown in the completely folded up state and the fully extended state.

In FIG. 9 the right-hand anti-dazzle sun visor 200 (viewed from the inside of the passenger compartment) is shown as completely folded up whilst the left-hand anti-dazzle sun visor is shown as completely extended.

Figure 10:
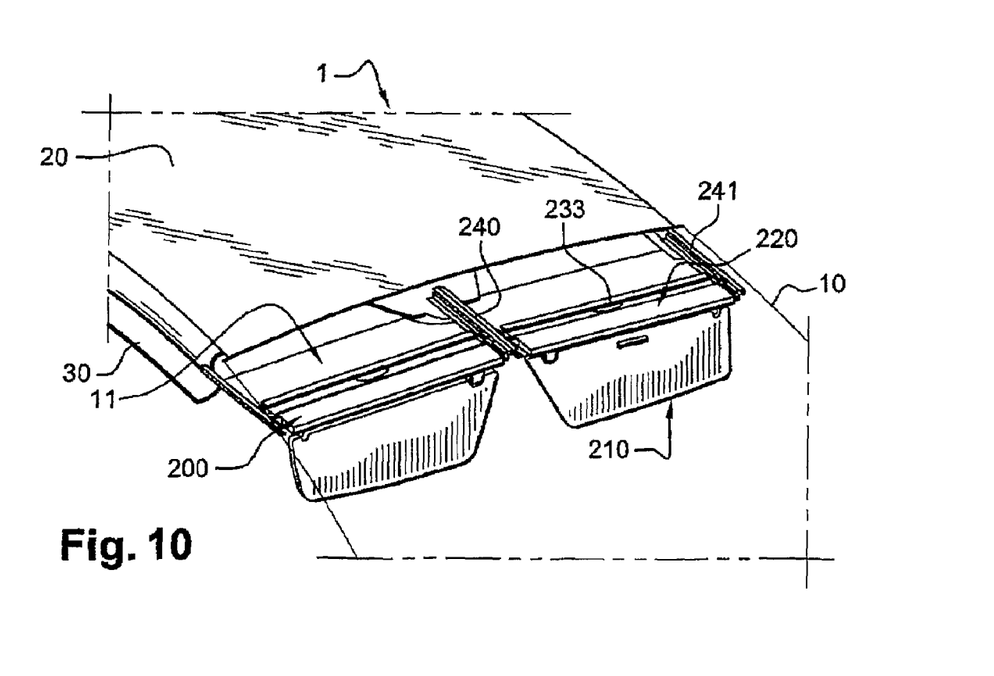
FIG. 10 shows a view similar to FIG. 9 but with the two anti-dazzle sun visors partially used.

FIG. 10 shows the two anti-dazzle sun visors 200 in the same state, i.e. with both blinds 230 in the open position and both screens 210 in the folded up position.

Figure 11:
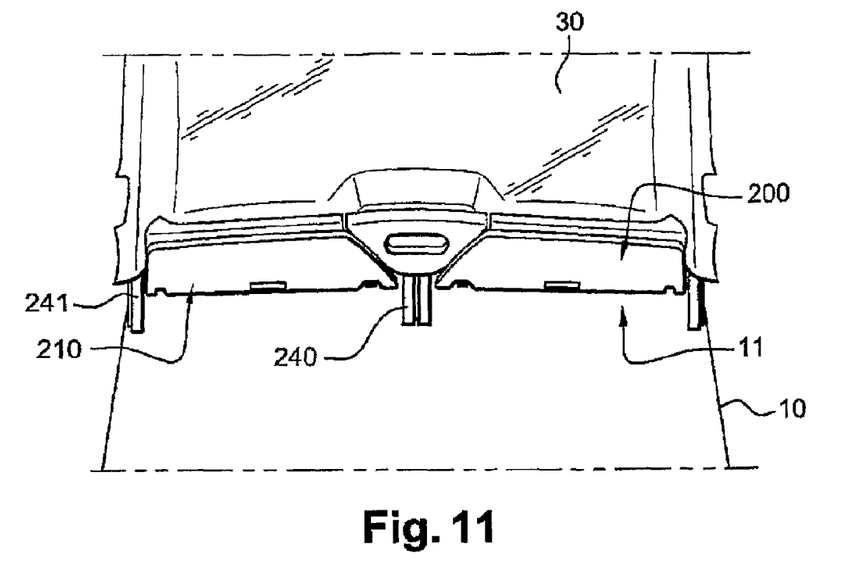
FIG. 11 shows a bottom view of the windshield according to FIGS. 9 and 10 with the anti-dazzle sun visors completely folded up.

In FIG. 11, the two anti-dazzle sun visors 200 are also shown in an identical state, i.e. completely folded up.

Figure 12:
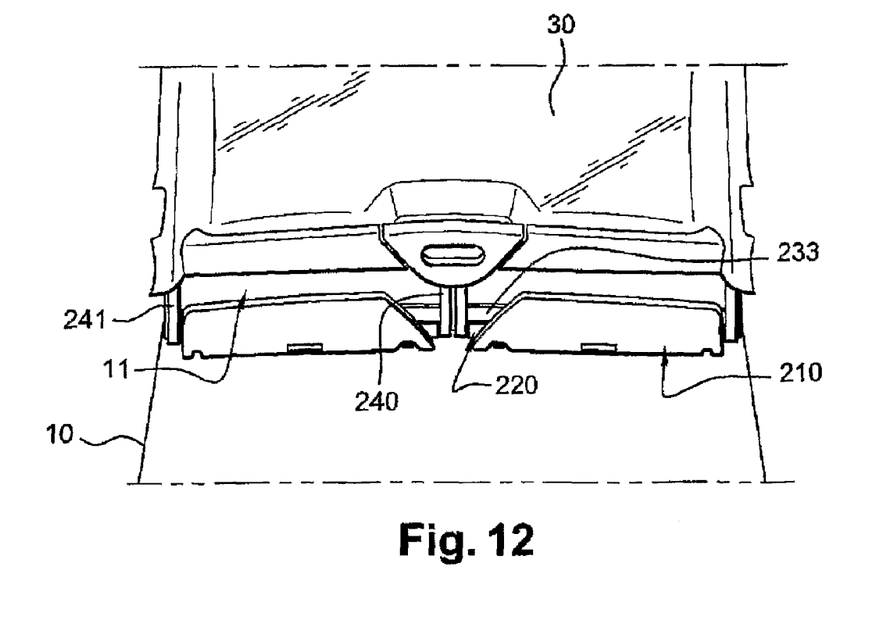
FIG. 12 shows a view similar to FIG. 11 but with the two partially retracted anti-dazzle sun visors.

FIG. 12 finally shows a further example of the embodiment in which the two blinds 230 are located in the open position, and the two screens 210 are in the folded up position.

Naturally the invention generally relates to any motor vehicle which as described above is provided with at least one anti-dazzle sun visor 100, 200.

I claim:

1. An anti-dazzle sun visor (100, 200) which is intended to be mounted in the upper part of a windshield (10) of a motor vehicle (1), characterized in that it is provided with a screen (110) which is articulated to a suspension device (120, 220) which is movably mounted for displacement along the windshield (10), as well as a blind (130, 230) which may be extended below a part (11) of the windshield (10), which extends between the movable suspension device (120, 220) and the upper edge of the aforementioned windshield (10).

2. The anti-dazzle sun visor (100, 200) as claimed in claim 1, characterized in that the blind (130) is movably mounted for displacement between an open position in which it is received in the vicinity of the part (11) to be blacked out of the windshield (10) and a closed position, in which it extends below the aforementioned part (11) to be blacked out.

3. The anti-dazzle sun visor (100, 200) as claimed in claim 2, characterized in that the blind (130) in the open position is received in the region of a fixed part of the anti-dazzle sun visor (100) which forms a receiver region.

4. The anti-dazzle sun visor (100) as claimed in claim 3, characterized in that the receiver region is intended to be positioned in the vicinity of the upper edge of the windshield (10).

5. The anti-dazzle sun visor (200) as claimed in claim 2, characterized in that the blind (230) is received in the open position in the region of the movable suspension device (220).

6. The anti-dazzle sun visor (100) as claimed in one of claims 1 to 5, characterized in that the use of the blind (130) is associated with the displacement of the movable suspension device (120).

7. The anti-dazzle sun visor (100) as claimed in claim 6, characterized in that the blind (130) is received in the region of a fixed part of the aforementioned anti-dazzle sun visor (100), one end of the aforementioned blind (130) being moreover fixedly connected to the movable suspension device (120).

8. The anti-dazzle sun visor (100) as claimed in claim 6, characterized in that the blind (130) is received in the region of the movable suspension device (120), one end of the aforementioned blind (130) moreover being fixedly connected to a fixed part of the aforementioned anti-dazzle sun visor (100).

9. The anti-dazzle sun visor (200) as claimed in one of claims 1 to 5, characterized in that the use of the blind (230) is independent of the displacement of the movable suspension device (220).

10. The anti-dazzle sun visor (200) as claimed in claim 9, characterized in that the blind (230) is of the type which may adopt a plurality of positions.

11. The anti-dazzle sun visor (200) as claimed in claim 9, characterized in that it is moreover provided with means for the temporary connection which are able to connect the free end of the aforementioned blind (230) to at least one fixing point in a disconnectable manner.

12. The anti-dazzle sun visor (100, 200) as claimed in one of claims 1 to 11, characterized in that the movable suspension device (120, 220) is slidably mounted along two guide rails (140, 141, 240, 241) which are intended to be arranged on both sides of the part (11) to be blacked out of the windshield (10).

13. The anti-dazzle sun visor (100, 200) as claimed in one of claims 1 to 12, characterized in that the blind (130, 230) comprises a canvas (131, 231), the two opposing ends thereof being respectively fixedly connected, on the one hand, to a rolling tube (132, 232), which is movably mounted in axial rotation in the vicinity of the part (11) to be blacked out of the windshield (10) and, on the other hand, a drawbar (133, 233) which is movably mounted for displacement along the aforementioned part (11) to be blacked out of the windshield (10).

14. The anti-dazzle sun visor (100, 200) as claimed in claim 13, characterized in that the drawbar (133, 233) is movably and slidably mounted along two guide rails (140, 141, 240, 241), which are intended to be mounted on both sides of the part (11) to be blacked out of the windshield (10).

15. The anti-dazzle sun visor (100, 200) as claimed in one of claims 1 to 14, characterized in that the screen (110) is movably mounted for pivoting, on the one hand, according to a first axis substantially parallel to the movable suspension device (120, 220) and, on the other hand, in a second manner substantially perpendicular to the aforementioned first pivot axis.

16. The motor vehicle characterized in that it is provided with at least one anti-dazzle sun visor (100, 200) as claimed in one of the preceding claims.

\* \* \* \* \*